UNITED STATES PATENT OFFICE.

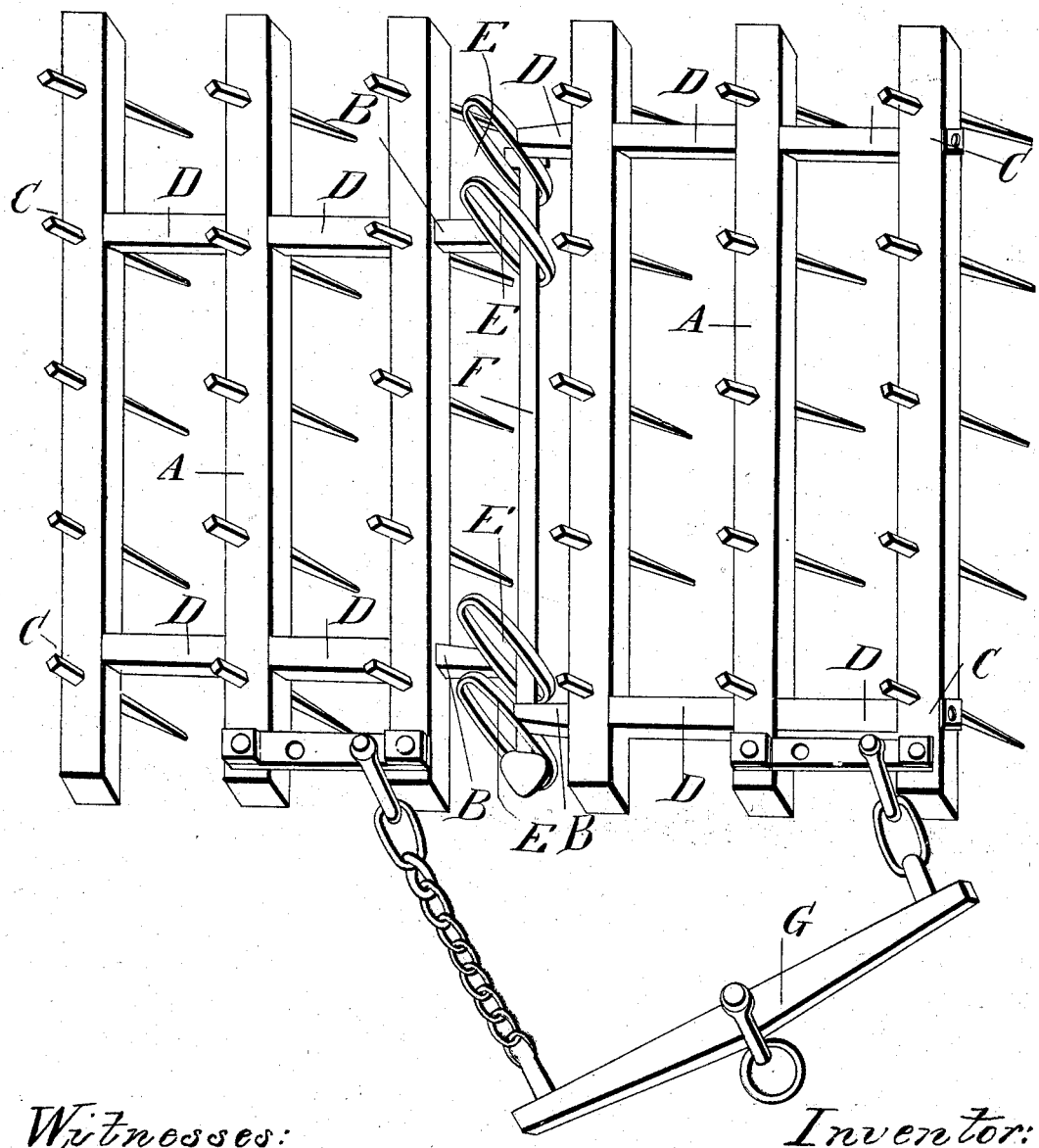

JOHN E. MORGAN, OF DEERFIELD, NEW YORK.

IMPROVEMENT IN HARROWS.

Specification forming part of Letters Patent No. 16,933, dated March 31, 1857.

*To all whom it may concern:*

Be it known that I, JOHN E. MORGAN, of Deerfield, in the county of Oneida and State of New York, have invented a new and useful Improvement in Harrows; and I do hereby declare that the following is a full and exact description thereof, reference being had to the accompanying drawing, and to the letters of reference marked thereon.

The nature of my invention consists in providing the means, by a peculiar construction of the coupling or connection between the two parts of the harrow, by which either of the parts may have a perpendicular as well as a horizontal motion when the harrow is in use independent of the other, so that obstacles may be passed by either part without disturbing the action of the other, and by which means undulations of the surface may be more perfectly reached and acted upon by one part of the harrow being permitted to move on a lower lever or on a different plane from the other.

In the drawing hereto annexed, A A is the frame of the harrow, constructed, in the usual manner, of two parts, consisting of three parallel tooth-beams each. These tooth-beams are connected and held together in the usual manner by iron rods passing from B to C through the beams and through the separating-bars D. There is a shoulder on the enlarged portion of these rods adjoining the beam at B, so that the whole frame is tightened up and secured by a nut and screw on the outer end of each rod. (Shown at C.)

To allow of the independent movement of the respective parts of the harrow, as above mentioned, these transverse rods have each upon the end B an elongated eye or link, E. The length of the interior opening of these links is about ten inches, and the width such as to allow the rod F to move freely within the link. These links stand vertically when the harrow lies in a horizontal position, and are all at an equal elevation. The transverse rods B are, moreover, inserted in the frames in such a position as when the parts of the harrow are brought together and connected by the rod F, inserted through the links, as shown in the figure, there will be allowed a sliding or horizontal movement on the rod F of about ten inches, more or less. The two parts being thus connected and held together by the rod F passing through the vertical elongated links E, it is evident that, the harrow being drawn in the usual manner by means of the attachment G, either of its parts is allowed to rise or fall ten inches above or below the other part without carrying the other with it or in any way affecting it, and that either part will also be allowed to pass in advance of the other or fall in the rear of it for a like distance without disturbing the action of the other. This independent perpendicular movement allows the parts of the harrow to accommodate themselves to the varied surface of the ground, so that when one part is passing flat and close upon a higher level the other is allowed to do the same upon a lower one, both lying horizontally, if necessary, or more or less and variously inclined, as the shape of the surface may require. It also allows one part of the harrow to ride over any obstacle that may be met with without materially, if at all, disturbing the other part; and in various other ways this freedom of action between the two parts of the harrow promotes and facilitates the effective agency of the harrow in more thoroughly pulverizing and cultivating the soil. The horizontal action between the two parts of the harrow by means of the sliding movement on the rod F, as described, also assists, in connection with the perpendicular movement described, both the passage of obstacles and the general action of the harrow.

I do not claim the connection of the two parts of the harrow by means of the rod F, nor do I claim the sliding or horizontal movement allowed upon this rod, as described, without the use of the vertical movement; but

What I claim as my invention, and desire to secure by Letters Patent, is—

The providing for the vertical action between the two parts of the harrow by means of the coupling formed by the use of the vertical elongated links E operating on the rod F, or its equivalent, as described, the whole being constructed and operating substantially in the manner herein set forth.

JOHN E. MORGAN.

Witnesses:
 WM. BAKER,
 GEORGE H. CONGAR.